(12) United States Patent
Chiang

(10) Patent No.: US 6,386,765 B1
(45) Date of Patent: May 14, 2002

(54) BOTTOM BRACKET HAVING A HOLLOW SHAFT WITH LARGER DIAMETER

(76) Inventor: Douglas Chiang, No. 487, Ko-Chung Rd., Ta-Li, Taichung Hsien (TW)

( * ) Notice: Subject to any disclaimer, the term of this patent is extended or adjusted under 35 U.S.C. 154(b) by 37 days.

(21) Appl. No.: 09/671,183

(22) Filed: Sep. 28, 2000

(51) Int. Cl.[7] ................................................ F16C 19/08
(52) U.S. Cl. ...................................... 384/545; 384/512
(58) Field of Search ................................. 384/512, 545, 384/540, 537, 517

(56) References Cited

U.S. PATENT DOCUMENTS 6,095,691 A * 8/2000 Chiang ........................ 384/458
6,116,114 A * 9/2000 Edwards ...................... 384/545

* cited by examiner

Primary Examiner—Lenard A. Footland
(74) Attorney, Agent, or Firm—Rosenberg, Klein & Lee

(57) ABSTRACT

A bottom bracket for bicycles includes a tube with a hollow shaft received therein and two first grooves are defined in an outer periphery of the hollow shaft. Two collars each have a second groove are mounted to the hollow shaft and balls are engaged with the first grooves and the second grooves. An inner tube is mounted to the hollow shaft and engaged between the two collars. Two races are respectively engaged with two ends of the tube and each race has a positioning flange for engaging with two respective second ends of the collars.

6 Claims, 5 Drawing Sheets

BOTTOM BRACKET HAVING A HOLLOW SHAFT WITH LARGER DIAMETER

FIELD OF THE INVENTION

The present invention relates to a structure of a bottom bracket for bicycles wherein the shaft of the bottom bracket is hollow and has grooves for receiving balls therein.

BACKGROUND OF THE INVENTION

A conventional bicycle bottom bracket 70 is shown in FIG. 5 and generally includes a tube 80 with a shaft 71 rotatably received therein and two bearings 73 are respectively mounted to the shaft 71 to allow the shaft 71 be rotatable. An inner tube 72 is mounted to the shaft 71 and engaged between the two bearings 73 to position the bearings 73. Two threaded races 74 are respectively engaged with two threaded portions defined in an inner periphery of the tube 80. Therefore, the two bearings 73 are firmly positioned between the inner tube 72 and the two races 74. The shaft 71 is made of solid metal so that the whole weight is heavy and not satisfied by the requirements of modern bicycles. Besides, each bearing 73 received in the tube 80 has an outer casing which has a certain thickness so that the shaft 71 has to be designed to have two shrink ends so that the bearings 73 can be received in the tube 80. On the contrary, if the shaft 71 is made to be hollow to obtain a light in weight, the shrink ends 71 are adverse to bear large loads.

The present invention intends to provide a structure of bottom bracket wherein the shaft is hollowed and has grooves for receiving balls so that conventional outer casing of bearings can be improved and the diameter of the two ends of the shaft can be enlarged.

SUMMARY OF THE INVENTION

In accordance with one aspect of the present invention, there is provided a bottom bracket for bicycles and comprising a tube with a hollow shaft received therein and two first grooves defined in an outer periphery of the hollow shaft. Two collars are mounted to the hollow shaft and each have a second groove defined in an inner periphery thereof so that balls are engaged with the first grooves and the second grooves. An inner tube is mounted to the hollow shaft and engaged between two respective first ends of the two collars. Two races are respectively engaged with two ends of the tube and each race has a positioning flange extending radially inward from an inner periphery thereof so that the two positioning flanges are engaged with two respective second ends of the collars.

The primary object of the present invention is to provide a bottom bracket that has a hollow shaft which as a larger diameter so that the total weight of the bottom bracket is reduced and the strength of the hollow shaft is enforced as the diameter thereof is increased.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
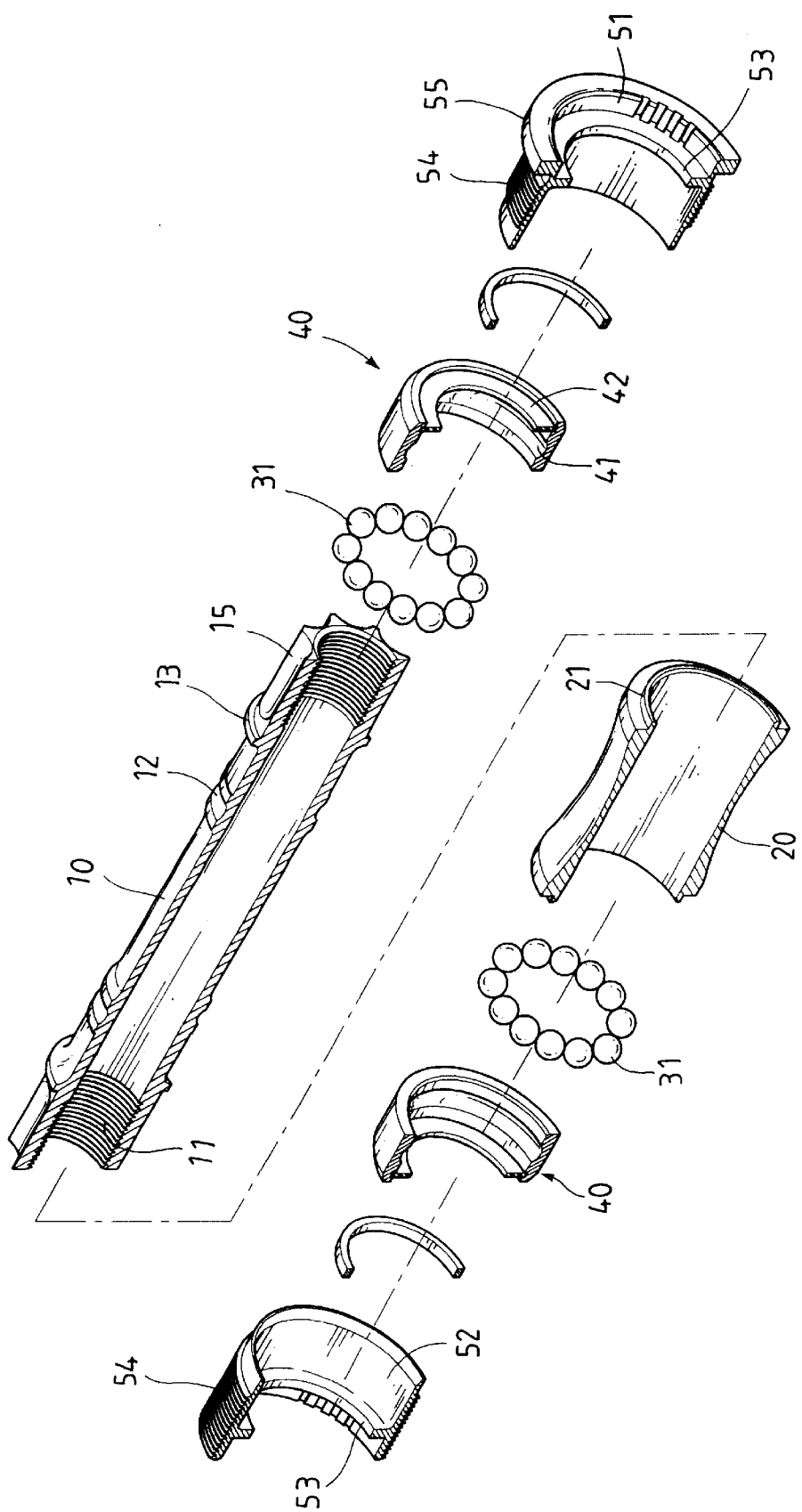
FIG. 1 is an exploded view to show a bottom bracket of the present invention.
Figure 2:
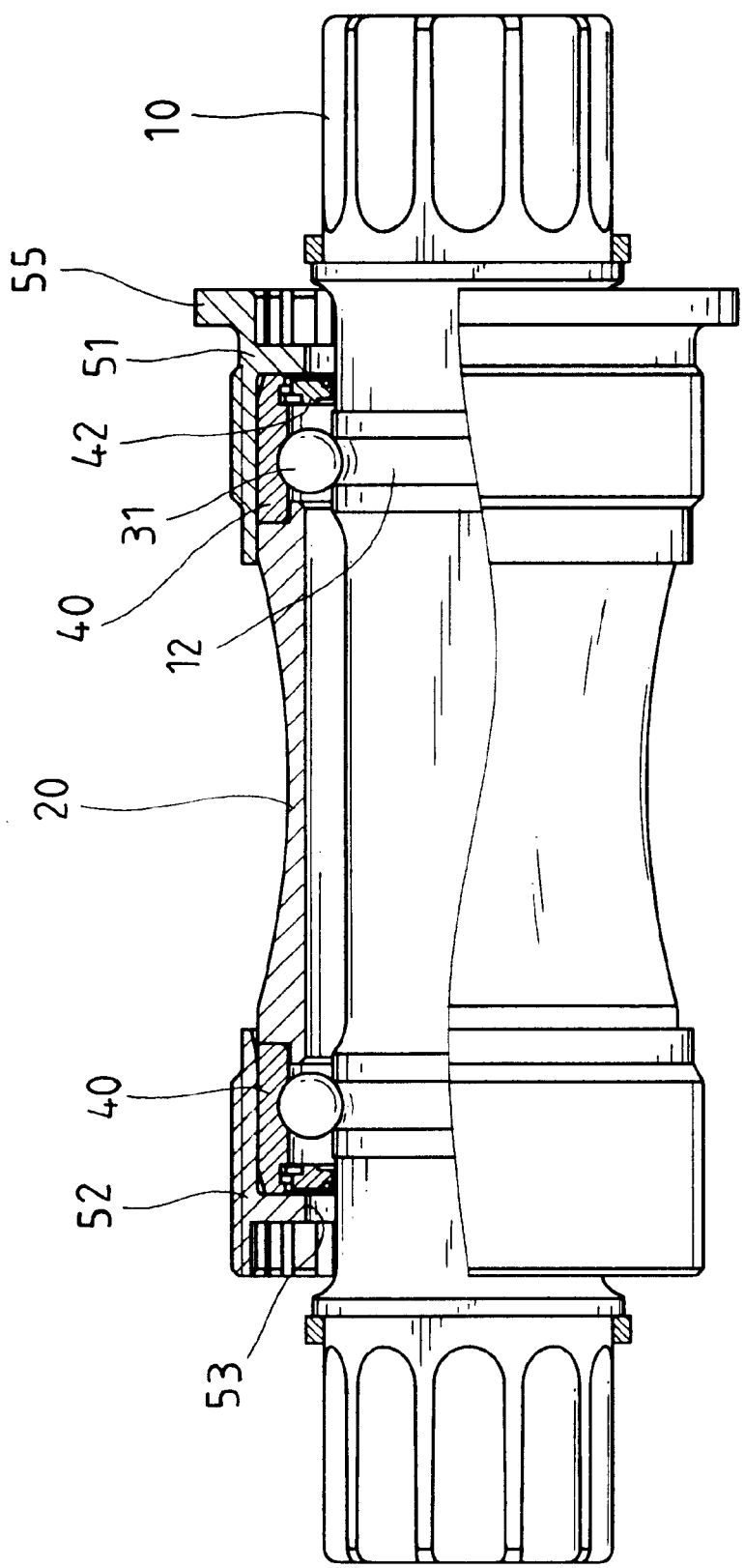
FIG. 2 is a cross sectional view to show the bottom bracket of the present invention.
Figure 3A:
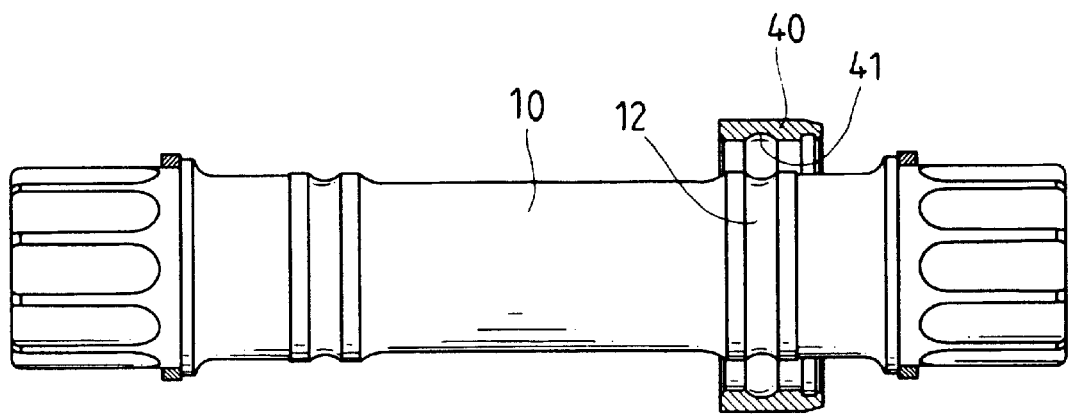
FIG. 3A illustrates a collar is mounted to the hollow shaft of the bottom bracket of the present invention.
Figure 3B:
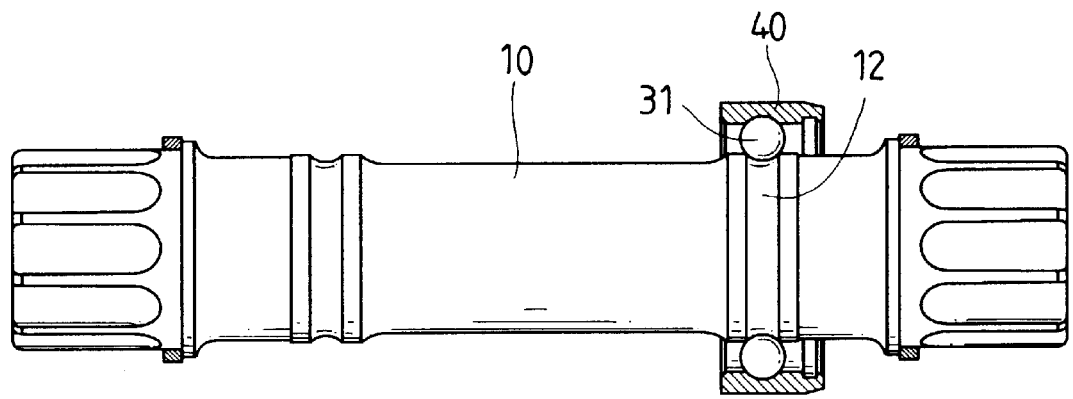
FIG. 3B illustrates balls are engaged between the collar and the hollow shaft of the bottom bracket of the present invention.
Figure 3C:
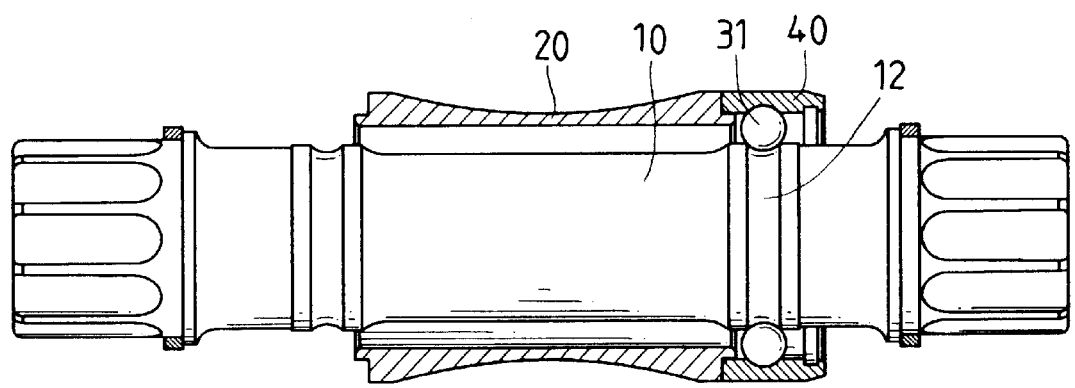
FIG. 3C illustrates an inner tube is mounted to the hollow shaft of the bottom bracket of the present invention.
Figure 3D:
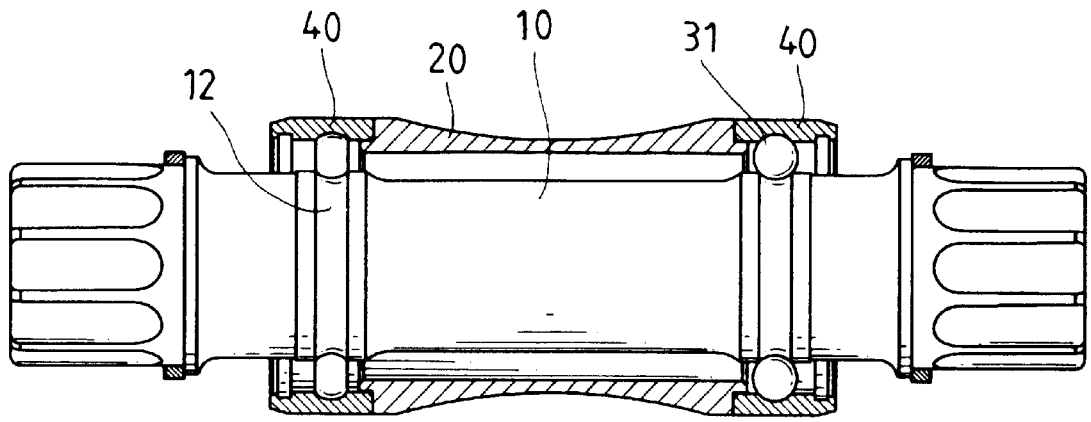
FIG. 3D illustrates the other collar is mounted to the hollow shaft and contacts the inner tube.
Figure 3E:
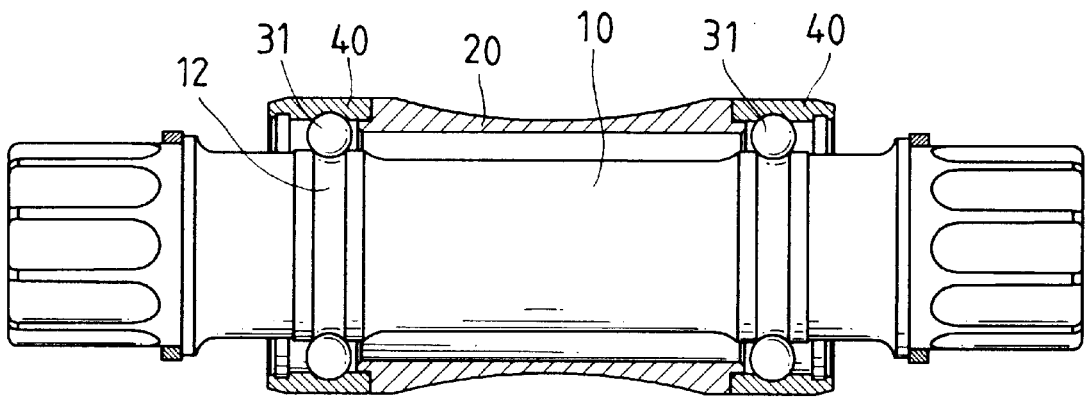
FIG. 3E illustrates balls are engaged between said the other collar and the hollow shaft of the bottom bracket of the present invention.
Figure 3F:
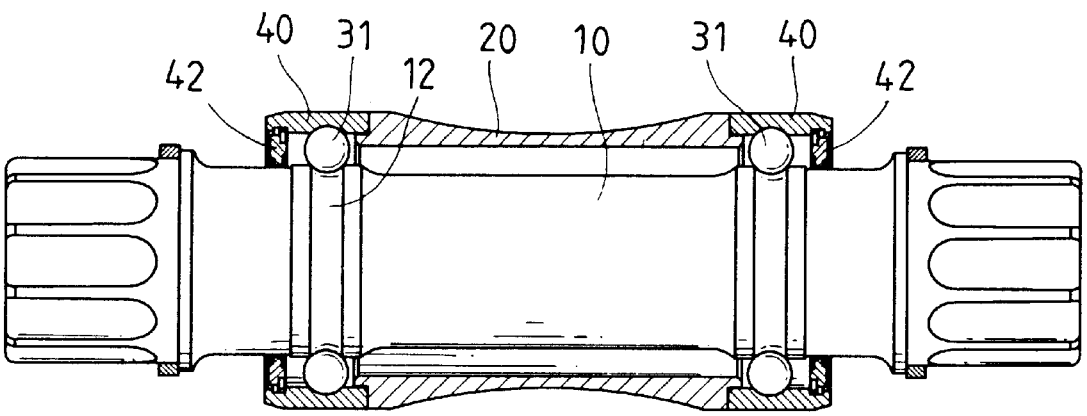
FIG. 3F illustrates each collar is engaged with a dust-proof ring.
Figures 4, 5:
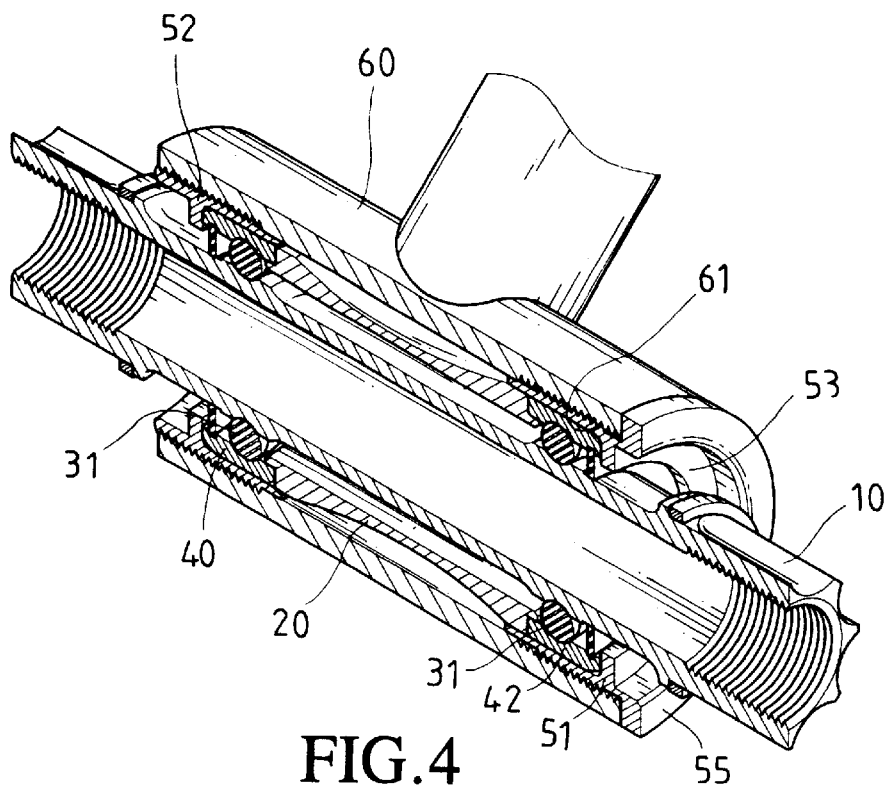
FIG. 4 is a perspective view, partly removed, of the bottom bracket of the present invention.
FIG. 5 is a cross sectional view to show a conventional bottom bracket.

Referring to FIGS. 1, 2 and 4, the bottom bracket for bicycles of the present invention comprises a tube 60 which has two threaded inner peripheries 61 defined in two ends thereof as shown in FIG. 4. A hollow shaft 10 is received in the tube 60 and has two first grooves 12 defined in an outer periphery of the hollow shaft 10. Two flanges 13 extend radially outward from the hollow shaft 10 and the first grooves 12 are located between the two flanges 13. Two threaded inner peripheries 11 are respectively defined in two ends of the hollow shaft 10 so as to be connected with other parts (not shown). The two ends of the hollow shaft 10 are respectively in a form of polygonal shape which is easily to be engaged with tools.

Two collars 40 are mounted to the hollow shaft 10 and each of the collars 40 has a second groove 41 defined in an inner periphery thereof. Balls 31 are engaged with the first grooves 12 and the second grooves 41. Each of the collars 40 has a dust-proof ring 42 engaged therewith so as to prevent dust or mud entering gaps between the balls 31. An inner tube 20 is mounted to the hollow shaft 10 and is shoulder portion 21 extending from each one of two ends thereof. The two shoulder portions 21 are respectively engaged between two respective first ends of the two collars 40.

Two races 51, 52 each have an insertion on which a threaded outer periphery 54 is defined. The insertions are inserted into the two ends of the tube 60 and engaged with the two threaded inner peripheries 61 defined in the two ends of the tube 60. Each race 51/52 has a positioning flange 53 extending radially inward from an inner periphery thereof and the two positioning flanges 53 are engaged with two respective second ends of the collars 40. The races 51, 52 are also positioned by the two flanges 13 on the hollow tube 10. The race 51 has an edge flange 55 extending radially outward therefrom so as to contact an end of the tube 60.

Because the balls 31 are engaged with the first grooves 12 in the hollow shaft 10 so that a gap between the tube 60 and the hollow shaft 10 is increased and the diameter of the hollow shaft 10 is therefore able to be increased. The larger diameter of the hollow shaft 10 means it can bear larger load without being deformed.

FIGS. 3A to 3F show the processes to assemble the collars 40, the balls 31, the inner tube 20 and the dust-proof rings 41 of the bottom bracket. One collar 40 is first mounted to the hollow shaft 10 and the balls 31 are received between the second groove 41 of the collar 40 and the first groove 12 in the hollow shaft 10. The inner tube 20 is mounted to the hollow shaft 10 and engaged with the collar 40, and the other collar 40 is mounted to the hollow shaft 10 and engaged with the inner tube 20. The balls 31 are engaged with the second groove 41 of said the other collar 40 and the other first groove 12 in the hollow shaft 10. The two dust-proof rings 42 are respectively engaged with the two collars 40.

The bottom bracket of the present invention has a light weight and the size of the hollow shaft 10 can be made large enough to bear a larger load.

While we have shown and described various embodiments in accordance with the present invention, it should be clear to those skilled in the art that further embodiments may be made without departing from the scope and spirit of the present invention.

What is claimed is:

1. A bottom bracket for bicycles, comprising:

a tube;

a hollow shaft having two first grooves defined in an outer periphery of said hollow shaft, said tube mounted to said hollow shaft;

two races mounted to said hollow shaft and each having a second groove defined in an inner periphery thereof, balls engaged with said first grooves and said second grooves;

an inner tube mounted to said hollow shaft and engaged between two respective first ends of said two races, and two collars respectively engaged with two ends of said tube and each collar having a positioning flange extending radially inward from an inner periphery thereof, said two positioning flanges engaged with two respective second ends of said raes.

2. The bottom bracket as claimed in claim 1, wherein each of said raes has a dust-proof ring engaged therewith.

3. The bottom bracket claimed in claim 1, wherein each of said collars has an insertion on which a threaded outer periphery is defined, said tube having two threaded inner peripheries defined in two ends thereof, said two respective threaded outer peripheries of said raes engaged with said two threaded inner peripheries defined in two ends of said tube.

4. The bottom bracket as claimed in claim 1 further comprising two flanges extending radially outward from said hollow shaft and said two first grooves located between said two flanges, said collars engaged with said two flanges.

5. The bottom bracket as claimed in claim 1 further comprising two threaded inner peripheries defined in two ends of said hollow shaft.

6. The bottom bracket as claimed in claim 1 further comprising an edge flange extending radially outward from one of said two races and said edge flange contacting an end of said tube.

* * * * *